United States Patent [19]

Hagberg

[11] 3,710,189

[45] Jan. 9, 1973

[54] TIME DELAY SIGNAL DEVICE ESPECIALLY FOR PHASE COMPARISON PROTECTIVE RELAYING SYSTEM

[75] Inventor: John E. Hagberg, Mountain Lakes, N.J.

[73] Assignee: Westinghouse Electric Corporation, Pittsburgh, Pa.

[22] Filed: July 22, 1971

[21] Appl. No.: 164,998

Related U.S. Application Data

[62] Division of Ser. No. 51,097, June 30, 1970, Pat. No. 3,612,952.

[52] U.S. Cl. ............317/27 R, 317/36 TD, 317/141 S

[51] Int. Cl. ............H01h 47/18

[58] Field of Search 317/27 R, 36 TD, 39, 141, 141 S

[56] References Cited

UNITED STATES PATENTS

| | | | |
|---|---|---|---|
| 3,295,019 | 12/1966 | Altfather | 317/39 X |
| 3,470,418 | 9/1969 | Hagberg et al. | 317/27 R |
| 3,612,952 | 10/1971 | Hagberg | 317/27 R |

*Primary Examiner*—James D. Trammell
*Attorney*—A. T. Stratton et al.

[57] ABSTRACT

A phase comparison relaying network which permits the delaying of the local signal which responds to the alternating current at the local terminal of the alternating current transmission line for an interval which may be greater than the time interval of 180° of the alternating current whereby to compensate for time delay in the transmission from the remote terminal of the alternating current transmission line to the local terminal a signal responsive to the alternating current at the remote terminal when the time of transmission is greater than the 180° interval.

12 Claims, 1 Drawing Figure

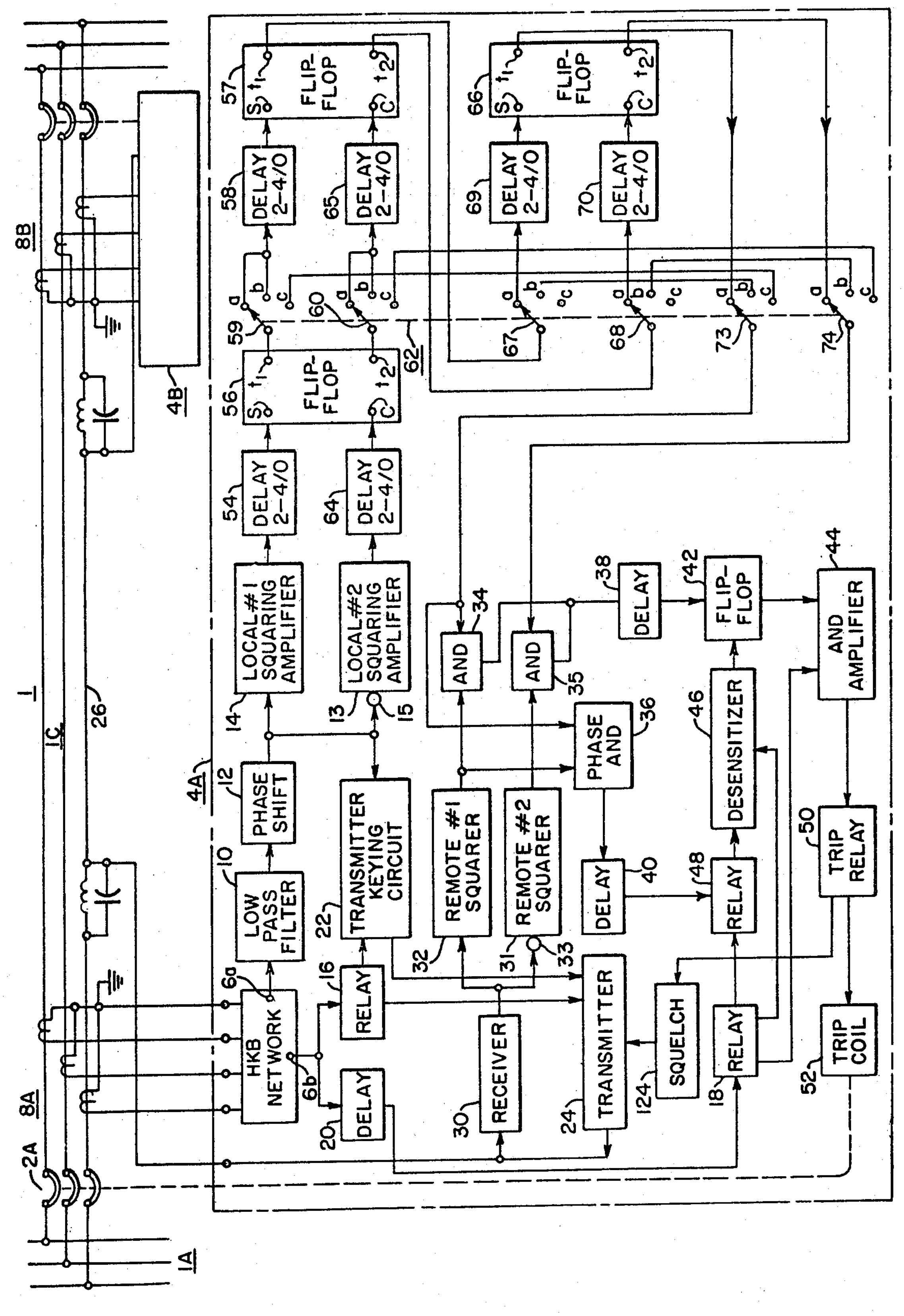
HKB NETWORK
LOW PASS FILTER
PHASE SHIFT
LOCAL #1 SQUARING AMPLIFIER
LOCAL #2 SQUARING AMPLIFIER
DELAY 2-4/0
FLIP-FLOP
TRANSMITTER KEYING CIRCUIT
RELAY
DELAY
RECEIVER
TRANSMITTER
REMOTE #1 SQUARER
REMOTE #2 SQUARER
AND
PHASE AND
SQUELCH
DESENSITIZER
AND AMPLIFIER
TRIP RELAY
TRIP COIL

TIME DELAY SIGNAL DEVICE ESPECIALLY FOR PHASE COMPARISON PROTECTIVE RELAYING SYSTEM

RELATED APPLICATIONS

This application is a divisional application of my prior copending application Ser. No. 51,097, filed June 30, 1970 now U.S. Pat. No. 3,612,952.

BRIEF SUMMARY OF THE INVENTION

In many instances where a signal is supplied from the remote to the local station for comparison with a signal derived at the local location it becomes necessary to provide a time delay in the circuit conducting the local signal to properly phase the local signal with the remote signal caused by the time delay in the transmission of the signal from the remote to the local station. This delay has particular applicability in a phase comparison relaying system which compares at the local terminal the phase of the current at the remote terminal of the alternating current transmission line to determine the location of the fault.

When the communication channel between the terminals has a time interval approaching or greater than the half cycle or 180° interval of the alternating power in the transmission line, a mere delay network cannot be used because the energization of the delay network would be terminated prior to the timing out of the delay network and with no output signal there would be no signal at the local station or terminal for comparison with the signal received over the communication channel from the remote terminal. In accordance with the present invention at least two delay networks separated by an actuating network (which may take the form of a flip-flop) is utilized. The delay in the first delay network, which may approach the half cycle interval of the alternating power, upon timing out actuates the actuating network or flip-flop. When so actuated the network remains actuated for at least a period equal to an interval equal to 180° of the alternating power. The energization of the flip-flop initiates an operation of the second delay network which delay network is added to that of the first network. The delay of each network is not greater than the 180° interval, but the sum thereof may equal a delay substantially in excess of the half cycle or 180° interval of the alternating power. As many actuating or flip-flop networks and delays as may be necessary to compensate for the transmission delay may be connected in series to give the desired timing interval.

BRIEF DESCRIPTION OF THE DRAWINGS

The drawing illustrates, in block form, a phase comparison relaying network embodying the invention.

DETAILED DESCRIPTION

Referring to the drawings by characters of reference the numeral 1 designates an alternating potential power transmission circuit which interconnects a first bus arrangement 1A with a second bus arrangement 1B through the contacts 2A and 2B of a suitable interrupting device, not further shown. The contacts 2A are opened in response to the energization of a trip coil 52 by a trip relay 50 in response to a fault in the circuit 1 between the busses 1A and 1B. The relaying networks

4A and 4B are identical and only one thereof is shown in detail. The description of the network 4A will therefore be applicable to network 4B.

The local terminal relaying network for 4A includes a suitable network 6 energized by the current flowing in the transmission line 1 by means of the customary transformer array 8A and in the usual manner, provides a single phase alternating quantity at its output terminal **6*a* and a direct current quantity at its output terminal 6*b*. The alternating quantity which is a weighed quantity comprising positive, negative and zero sequence components of the current in the line passes through a low pass filter 10, a phase shift network 12, and local squaring amplifiers 13 and 14. Under some conditions it may be desirable to omit the filter 10 and network 12. The squaring amplifier 13 is provided with a NOT input 15 so that the amplifiers 13 and 14** will be actuated in 180° phase relation with respect to each other.

The direct current output terminal **6*b* of the network 6 energizes a first relay 16 and a second relay 18 through a delay network 20. The relay 16 always operates prior to the operation of the relay 18. The relay 16, when actuated, renders effective a transmitter keying circuit 22 and permits the transmitter 24 to be operated by the transmitter keying circuit in accordance with an alternating quantity output of the network 6**.

The output of the transmitter 24 is connected to and supplies a controlled carrier signal to the conductor 26 of the network 1. This signal is transmitted over the conductor 26 to receivers of the relaying network 4B located at the remote station. The network 4B is energized by the transformer array 8B and includes a transmitter which transmits a signal over the line 26 to the receiver 30 of the network 4A which receiver is tuned to receive the carrier signal supplied by the transmitter embodied in the network 4B. In some instances it is contemplated that the transmitters in the networks 4A and 4B transmit on the same frequency and in other instances at different frequencies depending upon considerations well known to those skilled in the art. If the transmitter frequency is of constant frequency an on-off type of system may be used whereby the transmitters conduct at opposite half cycles so that when the current flows into the line at one end thereof and out of the other end thereof as in the case of an external fault one or the other of the transmitters will always be transmitting. In the case of an internal fault both transmitters will transmit together. In other cases instead of an on-off system a shift in frequency could be embodied.

The output of the receiver 30 is connected to a pair of remote squaring amplifier networks 31 and 32. The squaring amplifier network 31 is provided with a NOT input 33 whereby the squaring amplifier 31 will be actuated (in the case of an on-off transmission) when no signal is being received by the receiver 30 and the squaring amplifier 32 will be actuated when the receiver provides an output in response to the reception thereof of a carrier wave of the remote terminal transmitter.

The output terminal of the remote squaring amplifier 32 is connected to one input terminal of an AND network 34 and to the output terminal of the remote squaring amplifier 31 is connected to one input circuit of the AND network 35. A phase AND network 36 is connected in parallel with the AND network 34 which, as will be described below, resensitizes the desensitizer 46 through the delay network 40 in the event of an internal fault occurring subsequent to an external fault.

The output of the terminals of the AND circuit 34 and 35 are both connected to the input terminal of a delaying network 38.

The output of the local squaring amplifier 14 is connected to actuate a flip-flop 56 through a delay network 54. The $t_1$ terminal of the flip-flop 56 is energized as a consequence of the timing out of the delay network 54 and is connected to the terminal S of the flip-flop 57 through a delay network 58 which like the flip-flop 56 is actuated as a consequence of the timing out of the network 58 to energize its terminal *t*. Similarly, the output terminal of the local squaring amplifier 13 is connected to the terminal C of the flip-flop 62 through a delay network 64 to reset the flip-flop 62 with its output terminal $t_2$ energized and terminal $t_1$ deenergized as a consequence of the timing out of the delay network 64. Also this terminal $t_2$ is connected to the input terminal C of the flip-flop 57 through a relay network 65 to reset the flip-flop 57 upon the timing out of the delay network 65. More specifically, the output terminals $t_1$ and $t_2$ of the flip-flop 56 are connected to the arms 59 and 60 of a six pole triple throw switch 62. The *a* and *b* contacts associated with the switch arm 59 are connected together and to the input terminal of a delay network 64 and the *a* and *b* contacts associated with the switch arm 60 are connected to the input terminal of the delay network 65. The output terminals of the $t_1$ and $t_2$ flip-flop 57 are connected to switch arms 67 and 68 respectively of the switch 62. The terminals *a* associated with the switch arms 67 and 68 are respectively connected to the input terminals S and C of the flip-flop 66 through a pair of delay networks 69 and 70. The output terminals $t_1$ and $t_2$ of the flip-flop 66 are connected to contact *a* of the switch arms 73 and 74 respectively of the switch 62. The arms 73 and 74 are connected to the second input terminals of the AND networks 34 and 35 respectively. With the switch 62 in the *a* position, the flip-flops 56, 57 and 66 are sequentially actuated to supply the second input terminals of the AND networks 34 and 35 with square waves of an electrical quantity which are phase shifted, lagging, with respect to the square waves supplied by the local squaring amplifier by an amount determined by the sum of the timing of the delays 54,58 and 59 and of the delays 54, 65 and 70.

The contacts *b* associated with the switch arms 67 and 73 are connected together as are the contacts *b* associated with the switch arms 68 and 74 so that with the switch 62 in its *b* position the delay networks 69 and 70 are not used. Similarly, the contacts *c* associated with the switch arms 59 and 73 and the contacts *c* associated with the arms 60 and 74 are connected together so that with the switch 62 in its *c* position the delay networks 58 and 65 as well as the delay networks 69 and 70 are not used.

When the input signals applied to either or both of the AND networks 34, 35 are of proper phase relation with respect to each other (in phase) the delay network 38 is actuated. After the delay network times out a signal is applied to the flip-flop 42 which, assuming it has been sensitized by the operation of the desensitizer of 46 due to closure of the relay 18 will provide an output signal to the AND amplifier of 44. The relay 18 also sensitized the AND amplifier so that the signal from the output of the flip-flop 42 energizes the trip relay 50 which energizes the trip relay coil 52 to open the breaker contacts 2A. The trip relay 50 also operates a squelch network 124 for terminating transmission by the transmitter 24 after operation of the trip relay 50 and trip coil 52.

In the event that the fault which actuated the relays 16 and 18 was external to the line 1, the signals applied to the AND networks 34 and 35 would not actuate the delay 38. If this condition existed for the timing interval of the timer 48, the timer 48 will operate the desensitizer and prevent transients which might occur due to switching or otherwise from flipping the flip-flop 42 and falsely tripping the breaker contacts 2A.

In the event that subsequent to the remote fault and the timing out of the timer 48, an internal fault should occur, the phase AND network 36 would be actuated to cause the delay network 40 to time out. When delay 40 times out it will actuate the desensitizer 46 to sensitize the flip-flop 42. Since at this time the AND networks 34 and 35 have caused the delay 38 to time out the flip-flop 42 will flip and the contacts 2A will open.

Further details with respect to the general operation of the phase comparison relaying network embodying the devices 4A and 4B may be found in U.S. Pat. No. 3,295,019 dated Dec. 27, 1966 to C. T. Altfather which is incorporated herein by reference. The major difference between this embodiment and the embodiment of the said Altfather patent lies in the timing network which connects the local squaring amplifiers and the AND networks 34 and 35 by which a delay greater than the time interval of a one half cycle of the alternating power in the line 1 may be obtained to provide a greater delay compensation for a delay in the transmission of the signal at the remote location to the output of the remote squares 31 and 32.

This disclosure also distinguishes from the said Altfather patent in that a second local squaring amplifier 13 and a second remote squaring amplifier 31 are provided whereby a phase comparison may be made each half cycle of the alternating power of the network 1. This feature is disclosed and claimed in U.S. Letters Patent No. 3,470,418 dated Sept. 30, 1969 and granted to Herbert W. Lensner and myself.

When an internal fault occurs in the transmission line 1, the relay 16 closes first and establishes the operation of the transmitter 24 in both of the networks 4A and 4B. Subsequently both relays 18 operate. The receivers 30 receive the on-off transmission from the transmitters 24 in the opposite networks 4B and 4A. The output of the receiver is squared in the squarers 31 and 32 and applied to the first input terminals of the AND networks 34 and 35. The time required for the transmitter at the network 4B to supply the signal through the receiver 30 and squarers 31 and 32 to the AND networks 34 and 35 is greater than the time required for the local squaring amplifiers 13 and 14 to energize the second input terminals of the AND networks 34 and 35. The time for the remote signal to energize the first input terminals of the AND networks 34 and 35 may well be in excess of 8 milliseconds (assuming the protected power line to be of 60 Hz.). For example, assume a delay of 12 milliseconds. In this event each of the time delays 54, 58, 69 connected between the local amplifier 13 and AND network 35 and each of the time delays 64, 65 and 70 connected between the local amplifier 14 and the AND network 34 will be set to time out in 4 milliseconds.

The flip-flop 56 will be flipped by the timing out of the delays 54 and 64 to establish a first series of square half waves which lag the initiating series of square half waves from the amplifiers by 4 milliseconds. Similarly the flip-flop 57 will be actuated by the delays 58 and 65 to provide a second series of half waves which lag the first series by 4 milliseconds and the flip-flop 66 will be actuated by the delays 69 and 70 to provide a third series of half waves which lag the second series by 4 milliseconds.

It will be appreciated that the third series of half waves lag the initiating series of half waves by 12 milliseconds and (assuming an internal fault as described) the half waves of the third series will be in phase with the half wave of the remote squarers 31 and 32. This will permit the delay 38 to time out and an opening of the contacts 2A will occur.

If the fault was external, the square half waves at the two input terminals of the AND networks 34 and 35 would be 180° out of phase and the timing out of the delay 38 to open the contacts 2A would not occur.

What is claimed and is desired to be secured by United States Letters Patent is as follows:

1. A device for time delaying initiating signals which comprise spaced pulses of at least minimum predetermined duration and which pulses sequentially occur at intervals of a first duration, said device acting to delay said initiating signals by an interval of a second duration, said second duration being greater than said minimum duration, said device comprising first and second timers and an actuated device, said timers being effective to time out intervals of third and fourth durations respectively solely as long as an actuating signal is supplied thereto, each said timer being effective to reset to an initial condition upon the removal of said actuating signal, said third duration being less than said first duration, said actuated device being effective upon actuation to change from a first to a second condition and to remain in its said second condition for an interval not in excess of said first duration irrespective of the magnitude of said third duration, means operatively associating said first timer with said initiating signals whereby said first timer is supplied with an actuating signal during each of said minimum intervals of said initiating signal, means operatively connecting said first timer to said actuated device whereby said actuated device is placed in its said second condition as a consequence of each timing out of said first timer and solely for a time period less than said first duration, and means operatively connecting said actuated device to said second timer when said actuated device is in its said second condition and to remove said actuating signal to said second timer when said actuated device is in its said first condition.

2. The combination of claim 1 in which said actuated device will remain in either of its said conditions and means operatively connecting to said actuated device and actuated by said pulsating signals to actuate said actuated device from its said second condition to its said first condition at the end of each said initiating signal.

3. The combination of claim 1 in which said signals are electrical pulses supplied to a pair of input terminals, said timers are electrical timing networks, said second timer is connected to actuate a pair of output terminals at the end of each said fourth duration.

4. The combination of claim 3 in which means is provided to actuate said actuated network from its said second condition to its said first condition at the end of each said pulse whereby said minimum interval becomes equal to said duration of said electrical pulse.

5. The combination of claim 4 in which said timing intervals of each of said timing networks are not greater than substantially one half of said duration of said electrical pulse.

6. A device for time delaying initiating signals having intervals of a first duration by an interval of a second duration greater than said first duration comprising first and second timers and an actuated device, said timers being effective to time intervals of third and fourth durations as long as an actuating signal is supplied thereto, each said timer being effective to reset to an initial condition upon the removal of said actuating signal, said third and said fourth durations being less than said first duration, said actuated device being effective upon actuation to change from a first to a second condition and to remain in its said second condition for at least said first duration, means operatively associating said first timer with said initiating signals whereby said first timer is supplied with an actuating signal during the intervals of said initiating signal, means operatively connecting said first timer to said actuated device whereby said actuated device is placed in its said second condition as a consequence of the timing out of said first timer, means operatively connecting said actuated device to said second timer for supplying an actuating signal to said second timer when said actuated device is in its said second condition, said initiating signals being electrical pulses supplied to a pair of input terminals, said timers being electrical timing networks, said second timer being connected to actuate a pair of output terminals at the end of each said fourth duration, a third electrical timing network connected between said actuated network and said input terminals, said third network being actuated by said supplied pulses to initiate its said timing operations, said third timing network being effective as a consequence of its timing out to actuate said actuated network from its said second to its said first condition, a fourth electrical timing network connected to said actuated network, said fourth network being actuated by the actuation of said actuated network into its said second condition to initiate its said timing operation, means actuated by said fourth timing network as a consequence of the timing out of said fourth timing device to energize said output terminals with a produced pulse, and means causing said first and said third timing networks to be energized by alternate ones of said supplied pulses, whereby said output terminals are alternately energized by said second and said fourth timing networks.

7. In a network of the character described, a source of alternating potential, a plurality of timing devices, each said timing device having an input circuit and an output circuit, each said timing device being operable to alter the output condition of its said output circuit solely subsequent to a predetermined time interval after an alteration of the input condition of its said input circuit, a plurality of squaring devices, a bistable flip-flop means having first and second input means and first and second output means, said time interval of each said timing device being less that the time interval of one half cycle of said source potential, means connecting a first of said squaring devices to said source of potential for energization during corresponding alternate half cycles of a first polarity and connecting a second of said squaring devices to said source of potential for energization during corresponding alternate half cycles of a second polarity, means connecting said output circuit of a first of said timing devices to said first input means of said flip-flop means and connecting said input circuit of said first timing device to said first squaring device for energization of said first timing device, each of said half cycles of said first polarity and connecting said output circuit of a second of said timing devices to said second input means of said flip-flop means and connecting said input circuit of said second timing device to said second squaring device for energization of said second timing device, first and second output circuits, means connecting said output circuit of a third of said timing devices to said first output circuit and connecting said input circuit of said second timing device to said first output means and connecting said output circuit of a fourth of said timing device to said second output circuit and connecting said input circuit of said fourth timing device to said second output means of said flip-flop means, said flip-flop means being operable in response to the timing out of said first and said second timing devices to provide first and second energized conditions of its said first and second output means, said flip-flop means being effective when its said output means is in said first condition to initiate the timing out of said third timing device and being effective when its said output means is in said second condition to initiate the timing out of said fourth timing device.

8. The combination of claim 7 in which said flip-flop means comprise a bistable flip-flop device, said first and second input means comprising first and second input terminals of said flip-flop device and said first and second output means comprising first and second output terminals.

9. In a network of the character described, a pair of input terminals adapted to be energized from a source of periodically pulsing potential, a plurality of timing devices, a bistable means having input means and output means and first and second operating conditions, said flip-flop means being actuated between its said conditions as a consequence of a first and a second signal being supplied to its said input means, each said timing device having a timing interval less than the pulse time of said source potential, first circuit means connecting a first of said timing devices between said input means of said bistable means and said input terminals, said first timing device being effective to place said bistable means in said first operating condition in time delayed relation to the occurrence of said periodic pulses and to place said bistable means in said second operating condition in time delayed relation to the termination of said periodic pulses, a first output circuit, second circuit means connecting a second of said timing devices between said output circuit and said output means of said bistable means and operable to energize said first output circuit in a first time delayed relation to the change in state of said bistable means to its said first condition.

10. The combination of claim 9 including a second output circuit, said second circuit means connecting said second timing device between said second output circuit and said output means of said bistable means and operable to energize said second output circuit in a second time delayed relation to the change in state of said bistable means to its said second condition.

11. The combination of claim 10 in which said first and second time delayed relations are of equal time periods.

12. The combination of claim 10 in which said bistable means has first and second inputs and first and second outputs, said first timing device comprises a first and a second timer, said first circuit means connects said first timer between said input terminals and said first input of said bistable means and connects said second timer between said input terminals and said second input of said bistable means, said second timing device comprises a third and a fourth timer, said second circuit means connects said third timer between said first output of said bistable means and said first output circuit and connects said fourth timer between said second output of said bistable means and said second output circuit.

* * * * *